No. 851,982. PATENTED APR. 30, 1907.
R. F. DOWNEY.
MACHINE FOR CONSTRUCTING RAILWAYS.
APPLICATION FILED AUG. 27, 1906.
9 SHEETS—SHEET 1.
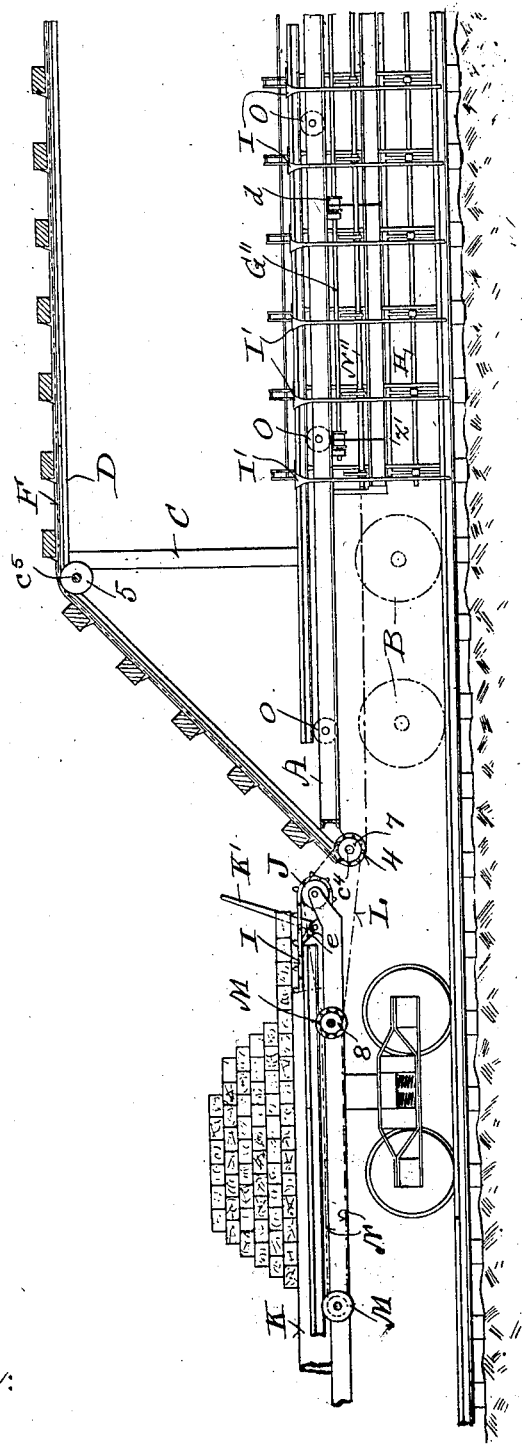
Witnesses:
Fred Palm.
George Felber.
Inventor
Richard F. Downey,
By Oliphant & Young,
Attorneys.

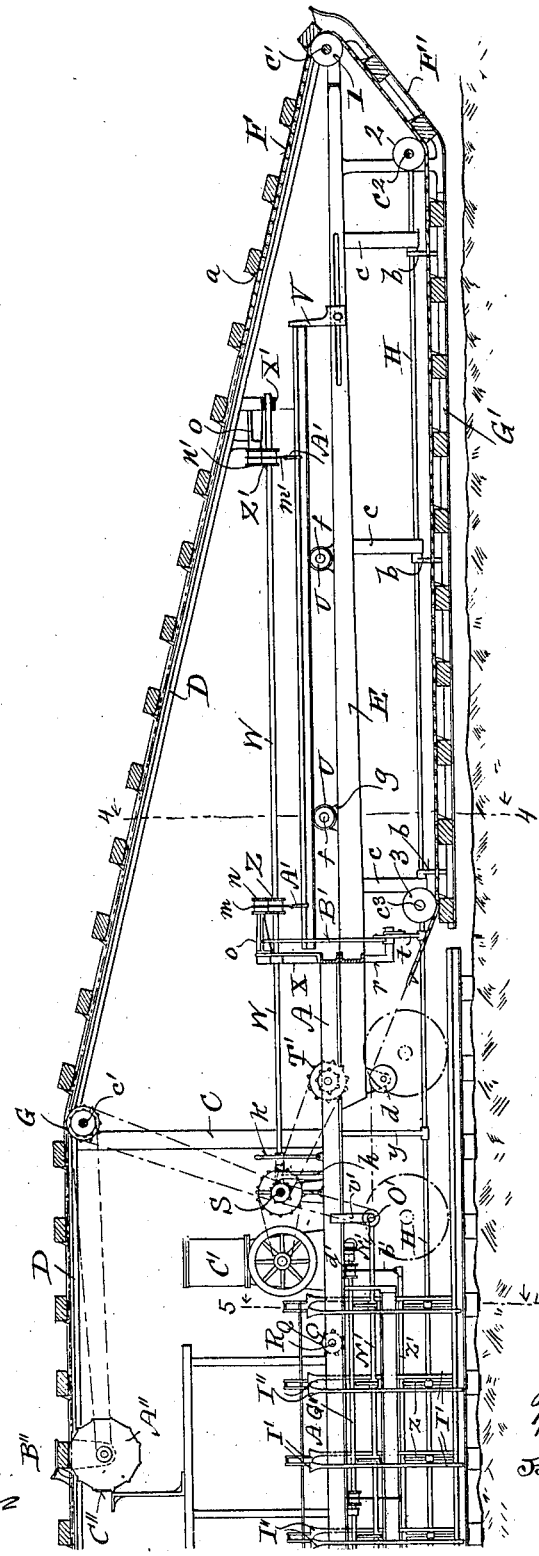

No. 851,982. PATENTED APR. 30, 1907.
R. F. DOWNEY.
MACHINE FOR CONSTRUCTING RAILWAYS.
APPLICATION FILED AUG. 27, 1906.
9 SHEETS—SHEET 3.
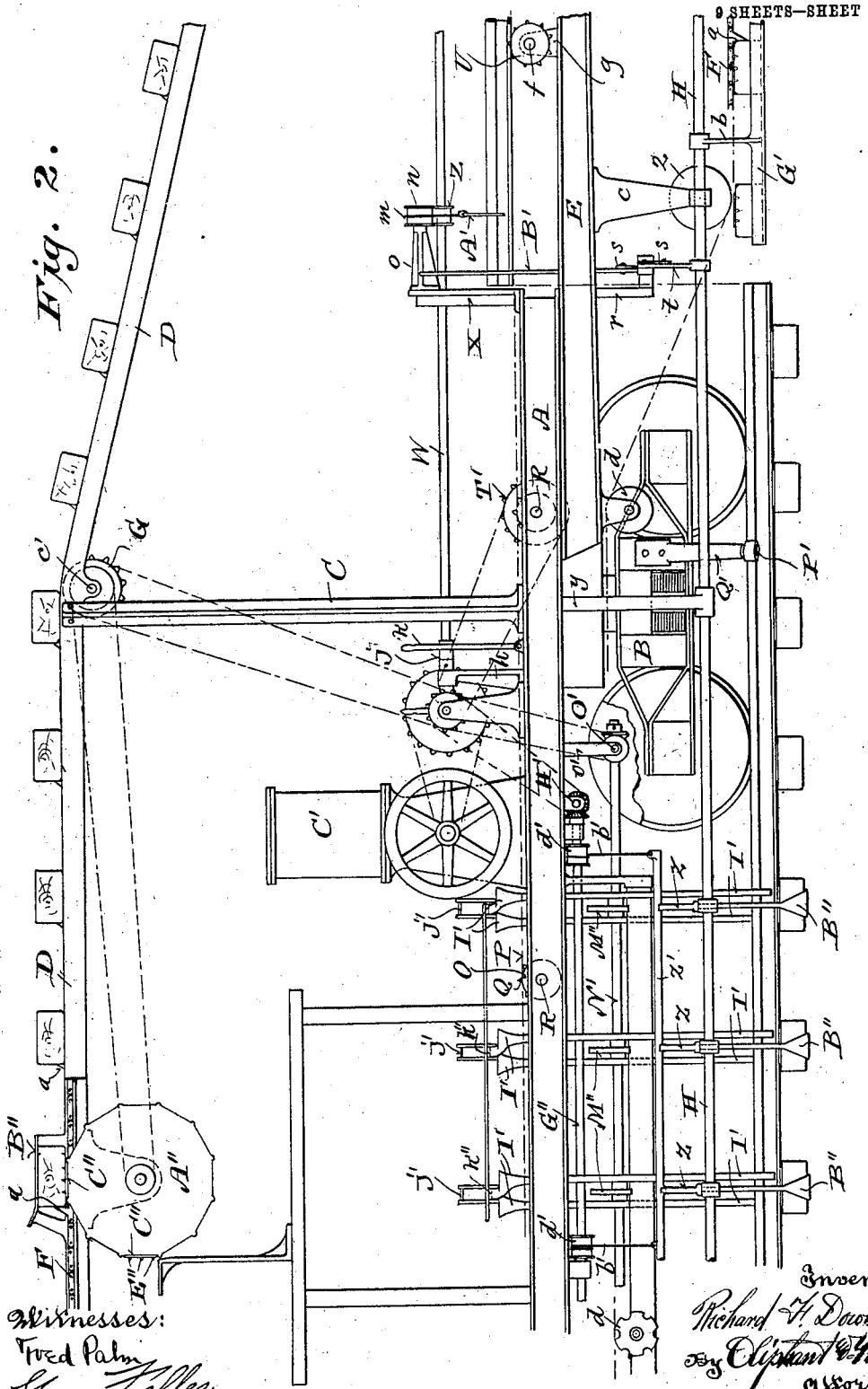

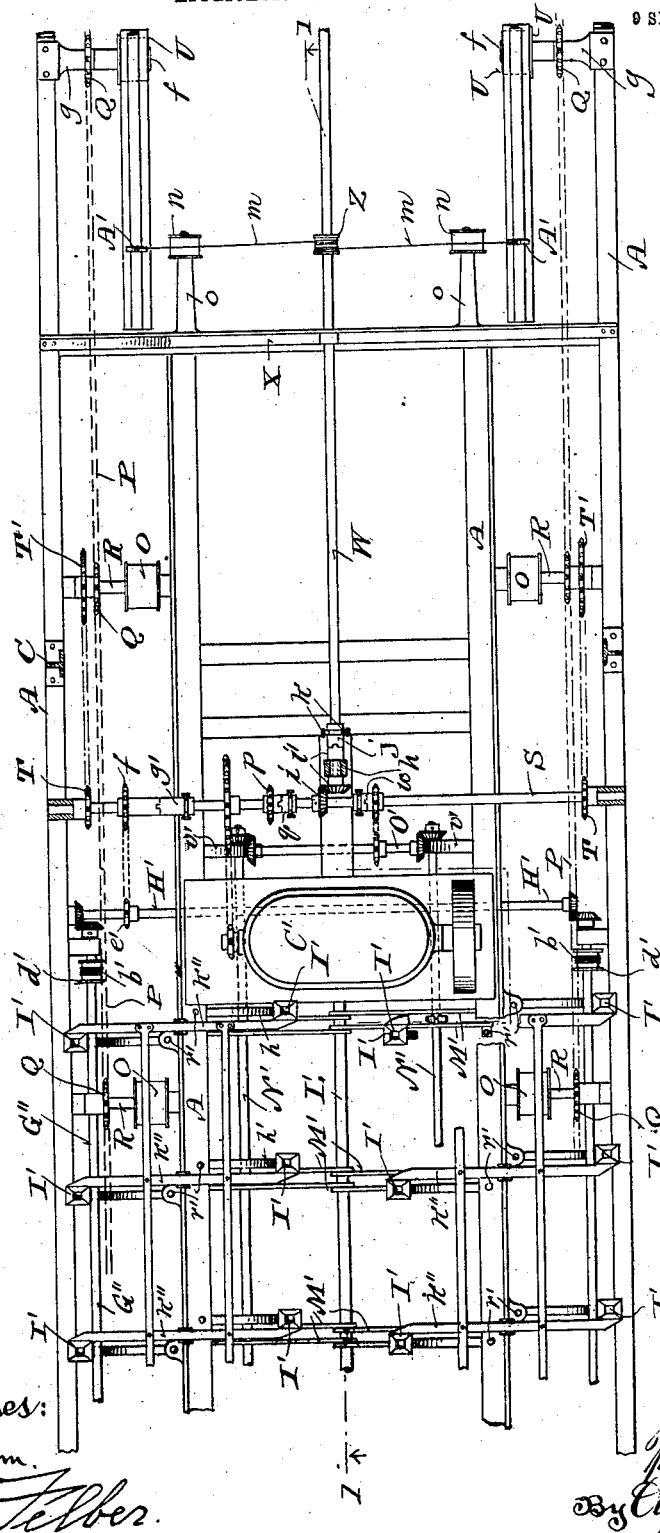

No. 851,982. PATENTED APR. 30, 1907.
R. F. DOWNEY.
MACHINE FOR CONSTRUCTING RAILWAYS.
APPLICATION FILED AUG. 27, 1906.
9 SHEETS—SHEET 5.
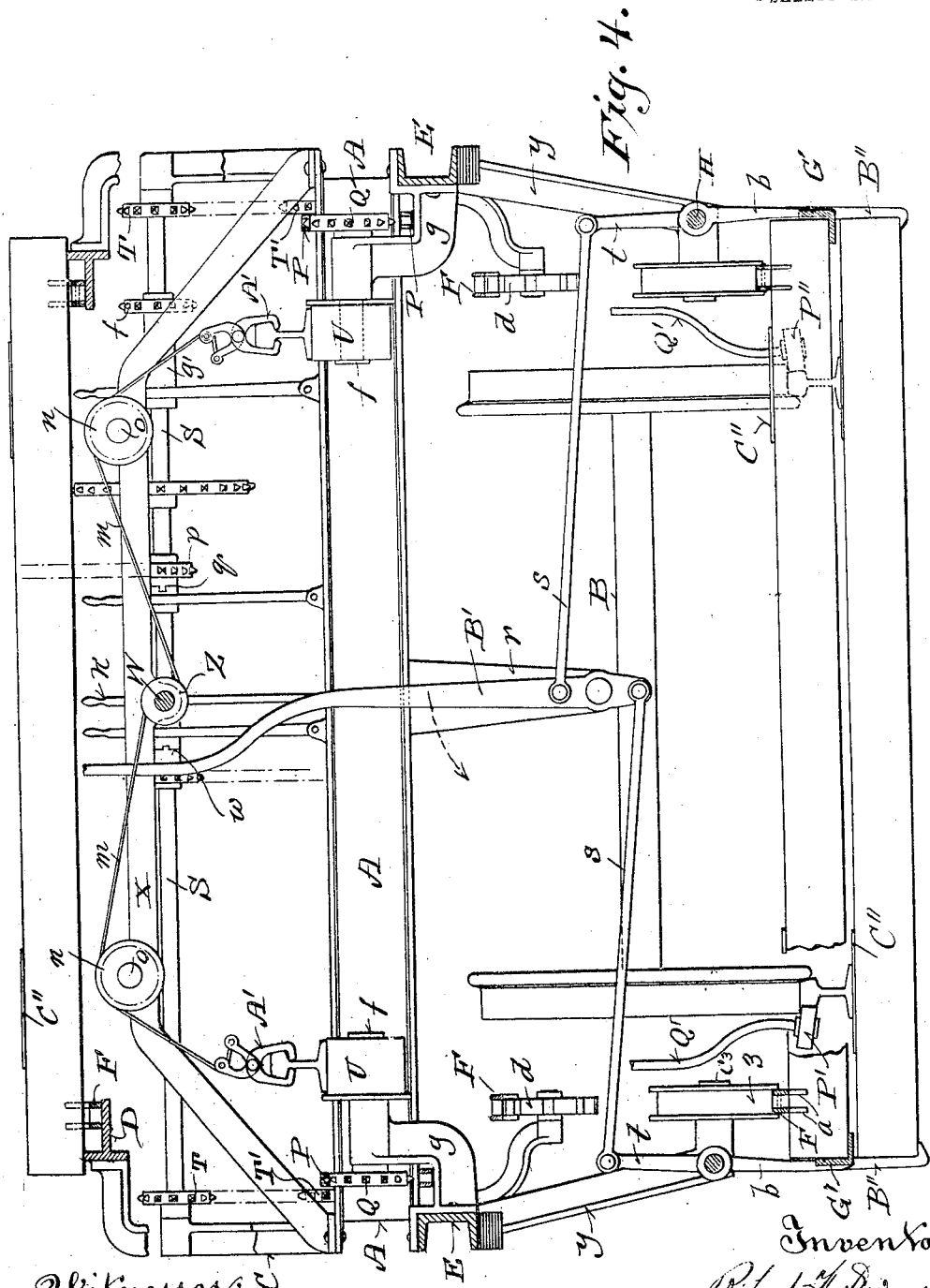

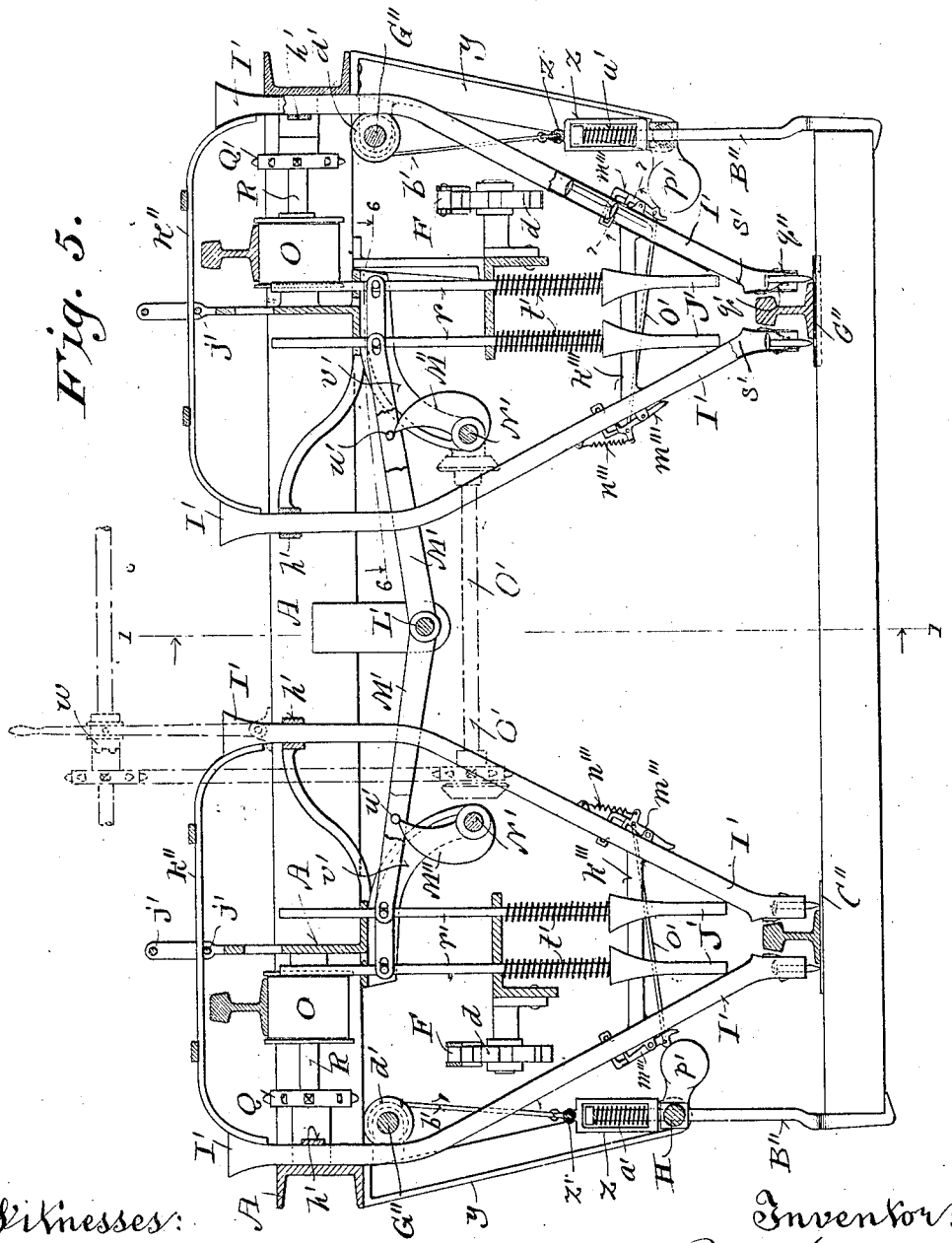

No. 851,982. PATENTED APR. 30, 1907.
R. F. DOWNEY.
MACHINE FOR CONSTRUCTING RAILWAYS.
APPLICATION FILED AUG. 27, 1906.
9 SHEETS—SHEET 7.
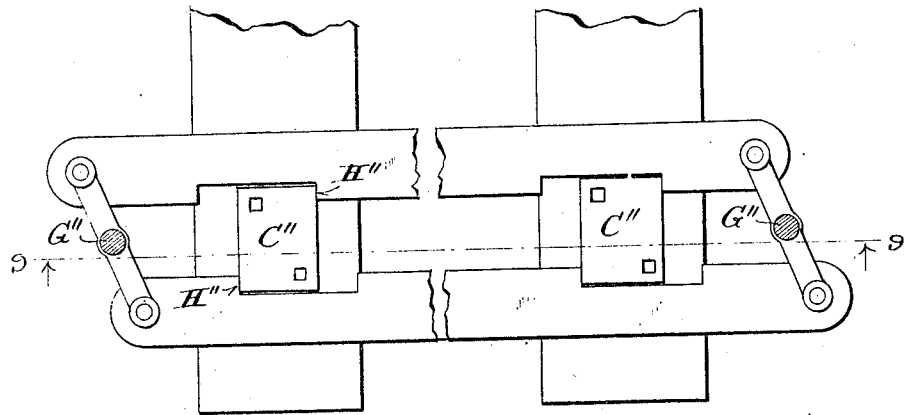
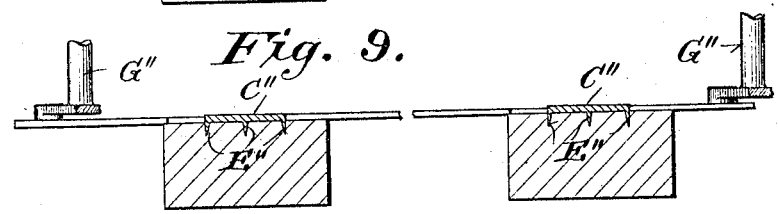
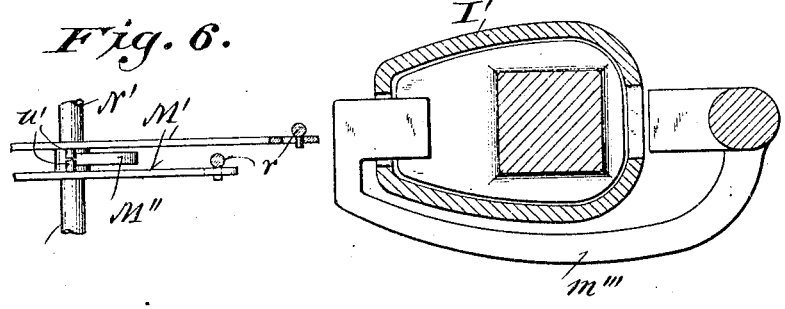
Witnesses:
Fred Palm.
George Felber.
Inventor:
Richard F. Downey
By Oliphant & Young.
Attorneys.

No. 851,982. PATENTED APR. 30, 1907.
R. F. DOWNEY.
MACHINE FOR CONSTRUCTING RAILWAYS.
APPLICATION FILED AUG. 27, 1906.

9 SHEETS—SHEET 8.

Witnesses:
Fred Palm
George Felber

Inventor
Richard F. Downey
By Oliphant & Young
Attorneys.

No. 851,982. PATENTED APR. 30, 1907.
R. F. DOWNEY.
MACHINE FOR CONSTRUCTING RAILWAYS.
APPLICATION FILED AUG. 27, 1906.
9 SHEETS—SHEET 9.
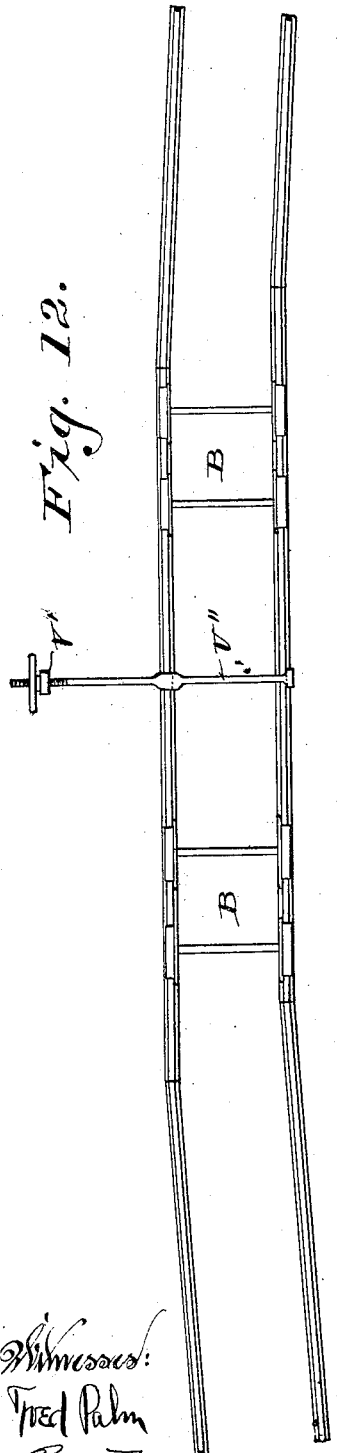
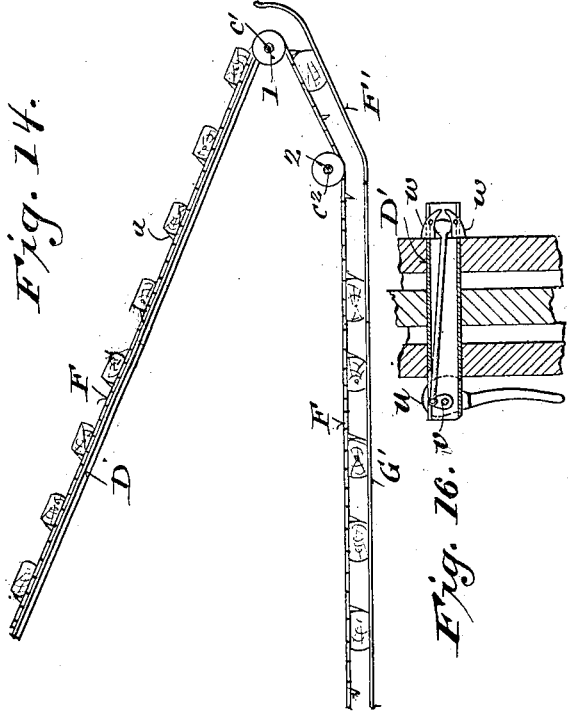
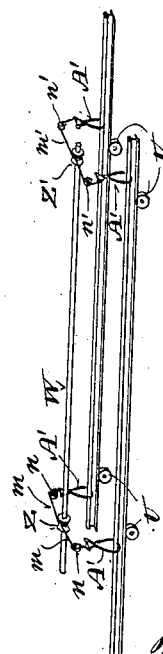
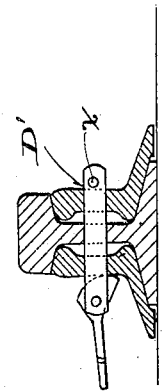

UNITED STATES PATENT OFFICE.

RICHARD F. DOWNEY, OF MILWAUKEE, WISCONSIN, ASSIGNOR, BY DIRECT AND MESNE ASSIGNMENTS, TO UNITED STATES RAILROAD TRACK BUILDING MACHINE COMPANY, A CORPORATION OF WISCONSIN.

MACHINE FOR CONSTRUCTING RAILWAYS.

No. 851,982.     Specification of Letters Patent.     Patented April 30, 1907.

Application filed August 27, 1906. Serial No. 332,200.

*To all whom it may concern:*

Be it known that I, RICHARD F. DOWNEY, a citizen of the United States, and a resident of Milwaukee, in the county of Milwaukee and State of Wisconsin, have invented certain new and useful Improvements in Machines for Constructing Railways; and I do hereby declare that the following is a full, clear, and exact description thereof.

The object of my invention is to provide a simple, durable and accurate machine for laying railway tracks, whereby great speed is attained with a minimum expenditure of unskilled labor, the machine being so constructed and arranged, that by a system of levers and clutches, it is entirely within the control of operators to cause ties and rails from adjacent flat-cars, to be fed forward and deposited in place upon the road-bed ahead of said machine, simultaneous with the spiking of the rails to ties just previously delivered upon said bed.

Said invention therefore consists in various peculiarities of construction and combination of parts as hereinafter fully set forth with reference to the accompanying drawings and subsequently claimed.

Figure 10:
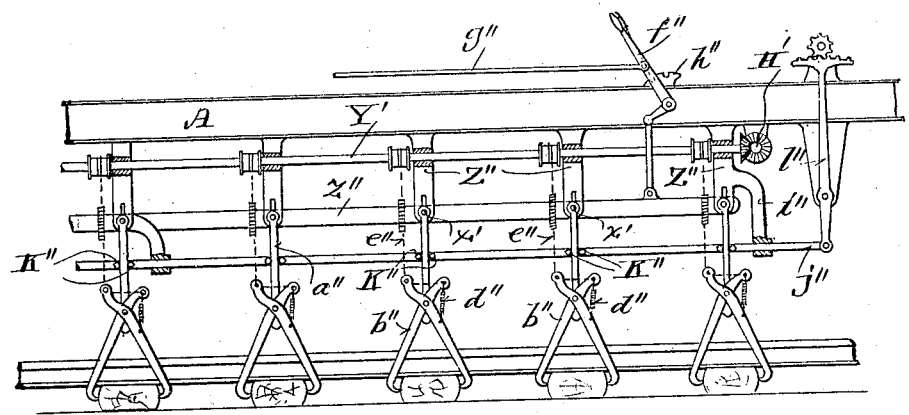
Figure 11:
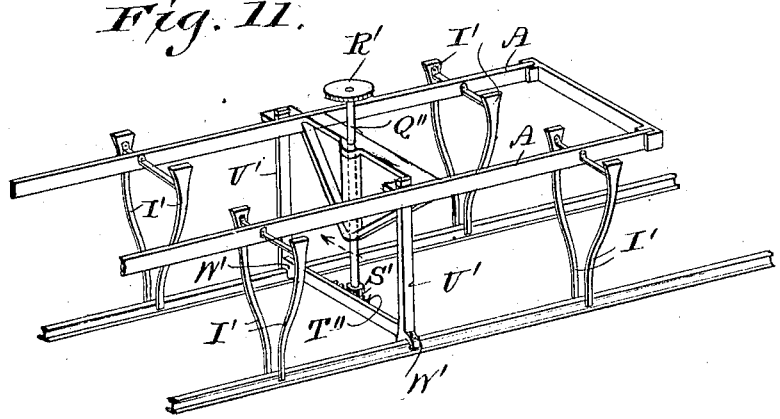

In the drawings: Figures 1 and 1ª, represents longitudinal sectional elevations of the rear and front portions of a track-laying machine made in accordance with my invention, with a portion of a flat car attached, illustrating the method of feeding the ties and rails therefrom to the machine, the section of said machine being indicated by lines 1—1 in Figs. 3 and 5; Fig. 2, an enlarged detail elevation of a portion of the front end of the machine with the overhanging boom extension broken away; Fig. 3, a plan view of the same; Figs. 4 and 5 enlarged cross-sections on lines 4—4 and 5—5 respectively of Fig. 1ª; Fig. 6, a detail plan sectional view of the strike hammer lifting levers, as indicated by line 6—6 of Fig. 5; Fig. 7, an enlarged cross-section of one of the spike-chutes and spike trip-mechanism, the section being indicated by line 7—7 of Fig. 5; Fig. 8, a plan view of a form of tie centering device to be used in connection with tie-plates; Fig. 9, a section of the same on line 9—9 of Fig. 8; Fig. 10, an elevation of a portion of the machine illustrating another form of tie-gripping and centering device attached thereto; Fig. 11, a diagrammatic perspective view of a portion of the machine-frame and lever-mechanism for springing the rails while being laid upon curves; Fig. 12, a diagrammatic plan view of another form of said springing-mechanism; Fig. 13, a perspective view of the rail lowering grips showing the rails fed forward at different distances, to break joints with each other; Fig. 14, illustrates the method of spacing the gangs of ties apart when delivered to the road-bed, in cases where a slight interval of time desired between delivering the ties to a road-bed and the starting of another gang, and Figs. 15 and 16 show forms of temporary locking bolts for the fish-plates, whereby ends of rails may be held together previous to the spiking operation.

Referring by letter to the drawings, A indicates the frame of a car, and B the trucks, the wheels only of the latter being indicated by dotted lines in Figs. 1 and 1ª. Fast to the frame are standards C, which serve as supports for overhead tracks D, which tracks at the rear of the machine incline downward and are secured to said frame A, the front end of said tracks being also inclined forward and connected to beams E, that are also secured to the car-frame, the beams being braced by the aforesaid tracks, and together therewith form a boom of sufficient length to carry forward and support the ties and rails of a section of track.

Endless carrier chains F are provided and arranged to travel over sheaves 1, 2, 3, 4, and 5 the first three mounted upon the boom and car-frame, said chains serving to elevate and deliver the ties in position to receive the rails. The carrier chains are driven by sprockets G, and rest overhead upon flanges of the tracks D, there being spurs *a* projecting from the chain links, at suitable spaces apart, for engagement with the ties, which ties, as they are fed forward overhead rest upon and are supported by said track. The end of the boom has secured thereto inwardly inclined angle-iron guides F', which conform to the angles of the chains at this point, and serve as supports for the ties as they are turned upon the sheave 1 preparatory to being delivered upon flanged guide-rails G', these guide-rails being mounted upon rock-shafts H by arms *b*, and these shafts in turn have their bearing in depending brackets c of the boom-beams.

The sprockets G are secured to a shaft $c'$ that has its bearings in the front standards C, while the sheaves 1, 2, 3, 4, and 5 are similarly mounted upon cross-shafts $c^1$, $c^2$, $c^3$, $c^4$, $c^5$, the first three of which are carried by the boom, and the remaining two, 4 and 5, are carried by the frame A and rear standard C respectively. The chains after leaving the idlers 3 are held clear of track obstruction by one or more guide-pulleys $d$ that are supported in suitable brackets depending from said frame.

The flat-cars containing ties are provided with endless spurred chains I, and sprocket drive-wheels J, the said chains being slightly below supporting strips K of the cars, upon which strips the ties rest, and when it is desired to feed a tie or ties forward to the machine, the operator rocks a lever K', an arm $e$ of which thereby lifts the chain sufficiently so that its spurs engage said ties and feed the same forward upon the adjacent surface of the carrier-chain F.

The sprocket drive-wheels J are driven by a link-belt 6, which receives its motion from a sprocket 7 on the sheave-shaft $c^4$, said link-belt being also carried over another sprocket 8, which is mounted on a stud secured to the side sill of the flat car, and imparts motion to one of a series of rollers M, from which the remaining rollers are driven by a belt N, as shown by dotted lines in Fig. 1, of the drawings.

The rollers N (only one of which is shown) extend equal distances apart throughout the entire length of the flat car upon either side thereof the width between each set being gaged slightly greater than that of the railroad track. The said rollers are provided for the purpose of receiving and delivering rails in pairs from a flat car (not shown) similarly equipped with rollers, and when an operator drops a rail upon these live rollers, it is immediately fed forward longitudinally from car to car under the cross-ties until it reaches the track laying machine, where it is received upon like rollers O, which are driven by chain-belts P, engaging sprocket-wheels Q, fast on the shafts R of said rollers, which chains receive their drive from a counter-shaft S, through a pair of sprocket-wheels T, T', fast on the counter-shaft, and an adjacent roller shaft R respectively, the said sprockets being in link-belt connection. Similarly driven rail delivery rollers U are also mounted upon studs $f$ of bracket $g$ projecting from the boom-beams. When a pair of rails have been fed forward upon the boom the desired distance to be dropped in place at the end of the last rails laid, they are stopped by arms V, adjustably secured to the boom beams, at which time lowering mechanism releases and permits the rails to drop in position. The said lowering-mechanism comprises a drive-shaft W located centrally of the machine and in suitable bearing of spanners X, X', secured to said machine-frame and the track D respectively, there being a third bearing post $h$ adjacent to the counter-shaft S, from which said drive-shaft W receives intermittent motion through bevel-gears $i$, $i'$, the latter having a clutch-member that is engaged by a splined clutch-collar $j$ on the aforesaid drive-shaft, which is operated by a hand-lever $k$ as shown. The drive-shaft W carries a pair of drums Z, Z', that have oppositely wound cables $m$, $m'$, secured thereto, the free ends of which pass over pulleys $n$, $n'$, and through eyes of one member of gripping-tongs A', and thence to the other arm thereof to which they are secured. The pulleys $n$, $n'$, are revolubly mounted upon studs $o$ extending from the spanners X, X', as shown, and are so spaced apart from the center of the machine as to bring the cables when hanging free therefrom upon a vertical line central of the gage of the railway track below.

By the above arrangement, when the rails are delivered to the track-bed the operator adjusts the several gripping-tongs to the rail-treads (see Fig. 4) and then throws lever $k$; this causes the clutch-member connected thereto to engage the clutch-sleeve of the bevel-gear $i'$, and thereby revolve drive-shaft W, in a direction to lift the rails free of their supporting rollers, said rails thereby adjusting themselves, by gravity, to the gage-line of the track. The operator then reverses lever $k$, which disengages shaft W from its drive, and permits the rails to drop into position upon the ties, previously deposited thereunder in a manner as set forth hereinafter.

Motion is imparted to the shaft $c'$, which drives the carrier-chains F through sprockets G, by a link-belt and sprocket-wheel connection from the counter-shaft S, the sprocket-wheel $p$ of said gear being loose on said counter-shaft and coupled thereto by a hand controlled clutch $q$, for the purpose of starting and stopping the carrier-chains at the will of the operator.

When the first of a gang of ties has reached the desired distance from the last tie already laid; (as shown in Fig. 1ᵃ of the drawings) the operator stops the travel of said carrier-chains. At this time there are a complete gang of the ties resting upon the flanges of the guide-rails G', and the next operation is to release the ties therefrom, this being accomplished by swinging a hand-lever B' from its normal central position in a direction as indicated by the arrow in Fig. 4 of the drawings.

The hand-lever B' is pivoted upon a depending arm $r$ of the frame A, and connected by rods $s$ pivoted on either side of its fulcrum to levers $t$ fast on the rock-shafts H. This mechanism when operated by the lever, as above described, will cause the guide-rails to swing outward and permit the ties to drop upon the road-bed.

All of the mechanism of the machine is driven by a motor $C'$ fast thereon and geared to the counter-shaft S, through sprocket-wheel and belt-connection, and said motor, if desired, may also serve as the propelling force of the machine to move the same forward at intervals as the work progresses, or the said machine together with its flat-cars may be pushed forward from the rear by a locomotive.

After the ties and rails are in position the abutting ends of the rails are temporarily fastened together by the usual fish-plates, the latter being clamped in place by cam-headed bolts $D'$, as shown in Figs. 15 and 16, the preferred form being that illustrated in the latter figure, which consists of a hollow bolt having pivoted at one end a yoked lever-cam $u$ exterior of the bolt, the pivot of which cam carries a fixed arm $v$ within the bolt. This arm has linked thereto a rod having a double face wedge flare at its free end for engagement with jaws $w$ pivoted in the head of the bolt, and when the head end of said bolt has been inserted into the openings of the fish-plates and rails, the lever-cam is turned in the position shown, thereby causing the rod to move forward, which movement simultaneously expands the jaws against the adjacent fish-plate and draws the several parts together by the action of the cam against the opposite plate. This temporary lock is allowed to remain until the rails have been spiked and may be replaced by bolts at will. The form of clamping-bolt shown in Fig. 15, is similar to that previously described, except in place of the expansible jaws a pin $x$ is substituted.

In laying the ties upon the road-bed, it necessarily happens that owing to slight irregularities of the road-bed, some of said ties may rest slightly below the flanges of the rails, and consequently when the same were spiked thereto the operation would be defective, with this in view, a system of tie retaining clamps are provided for temporarily drawing such ties as are low up to the face of rail flange, while the spiking operation is in progress.

The above mentioned mechanism (as best shown in Figs. 2 and 5) consists of sets of grapple-hooks $B''$, one set for each tie, the shanks of which pass through bosses of the rock-shafts H, said shafts being extended throughout the length of the machine for this purpose, and are supported in supplementary hangers $y$ depending from said machine. The shank of each grapple-hook projects beyond the rock-shaft H, and has mounted thereon a bail $z$, depending from a rod $z'$ and between the bottom of the bails and shank-heads are interposed springs $a'$, the rods $z'$ being connected by cables $b'$, to drum $d'$, all of which drums are secured to shafts $G''$ revoluble in hangers at either side of the machine. The said shafts $G''$ are in bevel-gear connection with a cross-shaft $H'$, which in turn is geared to the counter-shaft S, by a link-belt and sprockets $e'$, $f'$, the latter sprocket being loose on said counter-shaft and provided with a hand-clutch mechanism $g'$ for engaging and disengaging the same, whereby motion is transmitted at desired intervals to the drums $d'$ to draw the grapple-hooks up simultaneously. This is done just before the spiking, and owing to the yield of the springs $a'$, those hooks which first lift the ties are permitted a further motion in order to accommodate the remaining hooks to perform a like function.

When the operation of releasing the ties from the guide-rails $G'$ is performed, the swinging outward of the same also cause the grapple-hook to move outward and clear the ties, and when said rails are swung in, the said grapple-hooks likewise rock under the ties in position to be drawn upward.

Two series of vertically adjustable spike-chutes $I'$ are supported by the machine-frame, at proper intervals apart to insure the spikes being delivered to the ties, these chutes being guided in straps $h'$ and held vertical by pins $j'$ which are fitted into supports extending from the frame A, which supports and pins permit the chutes being dropped to their working position close to the ties or raised so as to clear the same when said machine is to be moved, the said chutes as shown being connected in pairs by upper and lower reaches $K'$, respectively.

In practice, each chute is filled with spikes one upon the other, the first spike being stopped by the lower nose of a latch $m''$ engaging the head thereof, the said latch having a similar nose upon a slightly higher plane that is normally out of the path of travel of the spikes. The latch is pivoted to the chute which has openings through which the noses of said latch are arranged to project and one latch of each pair is provided with a spring $n''$ connecting the same with the chutes and adapted to hold both latches in normal position through a rod $o'$ that is secured to the said latches upon opposite sides of their pivots. The release of each pair of spikes is obtained by a lug $p'$ (one of which is provided for each pair of latches) that projects from the rock-shafts H, and when the latter is rocked to bring the grapple-hooks under the ties these lugs strike the tails of the adjacent latches and free a spike, the upper nose of each latch being caught under the head of the next spike, as shown in Fig. 5 of the drawings. The swinging back of the rock-shaft permits the spring to act, thus drawing the lower nose under the retained spike, preparatory to being released at the next operation.

When a spike is in position to be driven, the latter is held upright and guided by a pair of leaf-springs $q'$, $q''$, projecting inward from the side walls of the chute and near the discharge or lower end thereof the said springs being sufficiently resilient to permit the spike-head to pass when driven. Hammers $J'$, having stems $r'$ that are guided in upper and lower frame-beams of the machine are provided, the heads of said hammers being arranged directly over openings $s'$ in the chutes through which said heads are driven to exert power upon the spikes. The weight of these hammers is further augmented by interposing spiral-springs $t'$ between the head thereof and the lower frame-beam in which the stems $r'$ are guided. Each of said hammer-stems are shackled to lifting-levers $M'$, which are fulcrumed to a common rod $L'$ hung centrally of the machine, and these lifting-levers are provided with tappets $u'$ arranged in the path of rotary cams $M''$ that are fast on shafts $N'$, which shafts have their bearings in hangers secured to the frame of the machine, and are driven by a cross-shaft $O'$ in bevel-gear connection therewith. The cross-shaft $O'$ is suitably mounted in boxes $v'$ depending from the frame-beams of the machine and said shaft is in link-belt and sprocket-wheel connection with the main counter-shaft S, there being a suitable lever controlled clutch $w'$ in conjunction with the aforesaid driving sprocket-wheel mounted on the counter-shaft to throw the spike hammers in and out of operation.

To operate the hammers the power being thrown on by means of clutch $w'$, the cams will revolve and raise the lifting levers together with the hammers with each revolution, and when the tappets $u'$ have passed the highest points of the cams they will permit the compressed spring to act by dropping off said cams, thereby imparting a succession of blows to the spikes necessary to force them tightly in place against the rail flanges.

After each section of track is laid, or that portion constituting the length of one rail, the machine moves forward a proportional distance completing the spiking of the last section and that portion of the section just laid to a point immediately back of the front truck of said machine. This forward movement consequently has to be made partly upon the rails not spiked, but made fast in the rear by the fish-plates, and in order to prevent disarrangement of the unspiked rails by reason of the front truck passing onto them, the said truck is provided with guide-rollers $P'$, the hangers $Q'$ of which are arranged to exert pressure upon the tread of the rails in opposition to the truck wheel flanges.

When laying straight track it is desirable to have the joints of parallel rails alined, while upon curves said joints are broken, as shown in Fig. 12 of the drawings, in the latter case one rail of course is fed in advance of the other, the arms V of the machine being adjusted for this purpose.

Fig. 11 of the drawings illustrates a mechanism for springing the rails to conform to curves in the road, and this mechanism consists of a vertical shaft $Q''$ suitably mounted in bearings in the frame A of the machine, the upper end of the shaft being provided with a worm-wheel $R'$ that is adapted to be geared to the engine by any well known means. To the opposite end of this shaft is secured thereto a pinion $S'$ adapted to mesh with a toothed rack $T''$, which rack forms part of a right-angle frame $U'$ that has feet $W'$ arranged to fit over the tread of the rails, the upper ends of the uprights $X''$ of said frame being fulcrumed in stirrups of the frame of the machine. Owing to the extreme weight and rigidity of said machine and the distance between its trucks, this mechanism when operated by applying power to its shaft will spring the right-angle frame either to the right or left as the case may require, and owing to the rigidity of the frame A, this action will cause the rails to spring with said frame $U'$, the shaft being held in its position until said rails are spiked.

With the carrier-chains F, as shown having spurs equidistant apart, it is obvious when the ties are delivered they will be accurately spaced so far as their driving edge is concerned, and they will necessarily all be in approximately the correct position to be spiked, but should said ties be of various widths, the surplus width over a standard tie would all be to one side of the spiking point. This condition where it is desirable may be overcome by grasping and centering the ties after they are laid and previous to being spiked. The mechanism for accomplishing this result is used as a substitute for the grappling-hook mechanism, and is shown in Fig. 10, the details of said mechanism being as follows: At either side of the machine-frame A are secured drum-shafts $Y'$ in bevel-gear connection with cross-shaft $H'$, the bearing hangers $Z''$ of the drum-shafts being extended downward and slotted to receive studs $x'$, which studs are connected to a strip $z''$ upon one side of the hangers $Z''$ and links $a''$ upon the opposite side thereof. Each of the links $a''$ have pivoted thereon, at the free end, tongs $b''$, which are held normally open by springs $d''$. The upper end of one of the tong members has secured thereto a cable $e''$ that passes through an eye in the other tong member, from which point it passes up and is secured to a drum of the shaft $Y'$, there being a stiff coiled spring intermediate of the cable to permit yield thereof. The strip $z''$ is connected to bell-crank levers $f'''$ (only one of which is shown) at either end thereof, said levers being also connected by a rod $g''$ so that when either bell-crank is rocked they together will cause a parallel rise or fall of said strip, the latter being held in its vertical position by detents $h''$ arranged to be engaged by latches of the bell-crank levers.

Two or more of the hangers Z' are formed with arms $i''$ for the support of a reciprocative rod $j''$ having pins $k''$ between which the links $a''$ hang and said rod at one end is connected to a walking beam $l''$ fulcrumed to the machine-frame, the upper end of which is formed with a segmental toothed rack that meshes with a power driven pinion, said power being imparted thereto at desired intervals.

By the preceding described mechanism and reference to Fig. 10, of the drawings, it will be seen that when a gang of ties are approximately in position under the rails, the tongs are dropped so that their gripping ends will straddle the ties; the spring in the meantime holding the tong members open. Now if motion is imparted to the drum-shaft, all of said tongs will immediately close over the ties, and a further movement upward, by a continued rotation of the drums will draw the ties up tightly against the rail flange, this motion being permitted by the studs $x'$, together with the link and strip $z''$. The bell-crank levers are then locked in the detents and rotation of the drum-shaft stopped.

The centering of the ties is the next operation, and is obtained by applying power to the walking-beam L'' through its power pinion in a direction necessary to rock the walking-beam to a vertical position and thereby draw upon rod $j''$, which movement, through the pins K'' also brings the tongs central, and in doing so causes the ties to stop in a likewise central position with relation to their width and the spiking point.

In Figs. 1, 1ª, and 2, is shown a reel A'' having polygonal faces for the reception of tie-plates, the reel being driven at a peripheral speed corresponding to the speed of the tie carrier-chains F, and is secured in bearings depending from the tracks D. The reel may be driven from any suitable source, and is shown in link-belt and sprocket connection with the drive-shaft $c'$ of the carrier-chain mechanism. Just above said reel, and forming part of the track D, is a strain-plate B'' under which the ties in their travel slide, to receive a tie-plate C'' which is embedded therein, the said tie-plates being fed upon the reel by an operator located upon a platform D'' provided for this purpose. These plates form no part of my invention, and, as shown, having projecting teeth E'' that are embedded into the ties by pressure as the reel revolves.

The tie-plate feed-mechanism is only used where inferior or soft ties are utilized. When said plates are used I may in connection therewith employ a centering device for ties, such as shown in Figs. 8 and 9 of the drawings. The above mentioned centering device consists of flat-plates and coupled in pairs by toggles having vertical stems G'' that project up through the machine and are arranged to be twisted so as to have the diametrically opposite edges H'' of the notches in the said plates engage the tie-plates and thereby center the ties. This mechanism is quite essential when using the tie-plates, for the reason that the same are formed as shown with spike-openings, which must be brought directly under the points of spikes as they are delivered from the chutes.

From the foregoing description, that working of the machine is obvious, the first step being the delivery of ties forward and dropping the same; second, feed of the rails and dropping them in place; third, moving the car and its supply-train of rails and ties forward, stopping the same, drawing up the ties, centering and finally spiking the rails and ties together; thus laying a track practically continuously; with the help of a small expenditure of unskilled labor, at a great speed and practically automatic.

In Fig. 12, a rail-spring rod U'' is shown as a substitute for the frame U' in the former, the rod is arranged to operate in direct connection with a post V'', anchored in the ground, said rod being drawn forward by a hand-wheel in threaded connection therewith.

I claim:

1. A portable machine for constructing railways, consisting of a frame mounted upon rail supported trucks, endless carrier mechanism mounted upon the frame for delivering ties forward of the machine at suitable intervals apart, means for clearing the ties from said carrier and depositing the same upon the roadbed, mechanism for feeding rails longitudinally and forward of the machine, other means for releasing the rails from the feed-mechanism and delivering the same in position upon the ties, and spike feeding and driving mechanism for securing said rails and ties together.

2. A portable machine for constructing railways, consisting of a frame mounted upon rail supported trucks, a forward boom-extension secured to the frame, endless carrier mechanism mounted upon the frame, and booms for delivering ties forward of the machine and returning the same under the booms at suitable intervals apart, overhead supports and guides for the carriers upon which the ties travel, other guides for supporting said ties under said booms, and means for releasing the aforesaid ties from the last named guides and depositing the same upon the roadbed.

3. A portable machine for constructing railways, consisting of a frame mounted upon rail supported trucks, a forward boom-extension secured to the frame, endless carrier mechanism mounted upon the frame, and booms for delivering ties forward of the machine and returning the same under the booms at suitable intervals apart, overhead supports and guides for the carriers upon which the ties travel, other guides for supporting said ties under said booms; means for releasing the aforesaid ties from the first named guides and depositing the same upon the roadbed, mechanism for feeding rails longitudinally and forward of the machine, other means for releasing the rails from the feed mechanism and delivering the same in position upon the ties, and spike feeding and driving mechanism for securing said rails and ties together.

4. A portable machine for constructing railways, consisting of a frame mounted upon rail supported trucks, a forward boom extension secured to the frame, endless carrier mechanism mounted upon the frame, and booms for delivering ties forward of the machine and returning the same under the booms at suitable intervals apart, overhead supports and guides for the carriers upon which the ties travel, other guides for supporting said ties under said booms, means for releasing the aforesaid ties from the last named guides and depositing the same upon the roadbed, and mechanism for feeding rails longitudinally and forward of the machine to the booms and over the deposited rails, and means for releasing the rails from the feed-mechanism and delivering the same in position upon the ties.

5. A portable machine for constructing railways, consisting of a frame mounted upon rail supported trucks, gangs of spike-feeders secured to said frame at suitable intervals apart for delivering spikes to a corresponding gang of ties having rails adjusted thereto, and spiking mechanisms in connection with the feeders.

6. A portable machine for constructing railways, consisting of a frame mounted upon rail supported trucks, a forward boom-extension secured to the frame, endless carrier mechanism mounted upon the frame, and booms for delivering ties forward of the machine and returning the same under the booms at suitable intervals apart, overhead supports and guides for the carriers upon which the ties travel, a revoluble plate carrying drum in connection with the carriers and overhead guides, whereby tie-plates are secured to the aforesaid ties, other guides for supporting said ties under said boom, and means for releasing the aforesaid ties from the last named guides and depositing the same upon the roadbed.

In testimony that I claim the foregoing I have hereunto set my hand at Milwaukee in the county of Milwaukee and State of Wisconsin in the presence of two witnesses.

RICHARD F. DOWNEY.

Witnesses:
GEO. W. YOUNG,
GEORGE FELBER.